(12) United States Patent
Zdenek et al.

(10) Patent No.: US 12,539,827 B2
(45) Date of Patent: Feb. 3, 2026

(54) METHOD FOR CALIBRATING A RAIN SENSOR, COMPUTER PROGRAM PRODUCT, RAIN SENSOR SYSTEM AND VEHICLE

(71) Applicant: VALEO SCHALTER UND SENSOREN GMBH, Bietigheim-Bissingen (DE)

(72) Inventors: Plhak Zdenek, Prague (CZ); Donald Peyrot, Prague (CZ); Vit Kadubec, Prague (CZ)

(73) Assignee: VALEO SCHALTER UND SENSOREN GMBH, Bietigheim-Bissingen (DE)

( * ) Notice: Subject to any disclaimer, the term of this patent is extended or adjusted under 35 U.S.C. 154(b) by 283 days.

(21) Appl. No.: 18/286,878

(22) PCT Filed: Apr. 5, 2022

(86) PCT No.: PCT/EP2022/058915
§ 371 (c)(1),
(2) Date: Oct. 13, 2023

(87) PCT Pub. No.: WO2022/218744
PCT Pub. Date: Oct. 20, 2022

(65) Prior Publication Data
US 2024/0198967 A1 Jun. 20, 2024

(30) Foreign Application Priority Data

Apr. 13, 2021 (DE) ..................... 10 2021 109 172.1

(51) Int. Cl.
*B60S 1/00* (2006.01)
*B60S 1/08* (2006.01)

(52) U.S. Cl.
CPC ........... *B60S 1/0833* (2013.01); *B60S 1/0892* (2013.01)

(58) Field of Classification Search
CPC .............................. B60S 1/0833; B60S 1/0892
See application file for complete search history.

(56) References Cited

U.S. PATENT DOCUMENTS

2002/0121972 A1    9/2002  Schofield et al.
2016/0370461 A1*  12/2016  Sugiura ................ G01N 21/552

FOREIGN PATENT DOCUMENTS

DE           10049401 A1    4/2002
DE       112015000377 T5    9/2016
(Continued)

OTHER PUBLICATIONS

International Search Report and Written Opinion in corresponding International Publication No. PCT/EP2022/058915, dated Jul. 22, 2022 (8 pages).

(Continued)

*Primary Examiner* — Jamel E Williams
(74) *Attorney, Agent, or Firm* — Osha Bergman Watanabe & Burton LLP

(57) ABSTRACT

A method for calibrating a rain sensor (3), the rain sensor (3) being configured to measure a quantity of rain on a window (101) of a vehicle (100), the rain sensor (3) including a transmitter (4) and a receiver (5), the transmitter (4) being configured to emit or transmit light to the window (101) and the receiver (5) being configured to receive measurement light that is emitted or transmitted by the transmitter (4) and guided to the receiver (5) by the window (101); the method comprising:
varying (S1) an incidence angle (α) of the light emitted or transmitted by the transmitter (4) to the window (101).

11 Claims, 7 Drawing Sheets

(56) References Cited

FOREIGN PATENT DOCUMENTS

Figure 1:
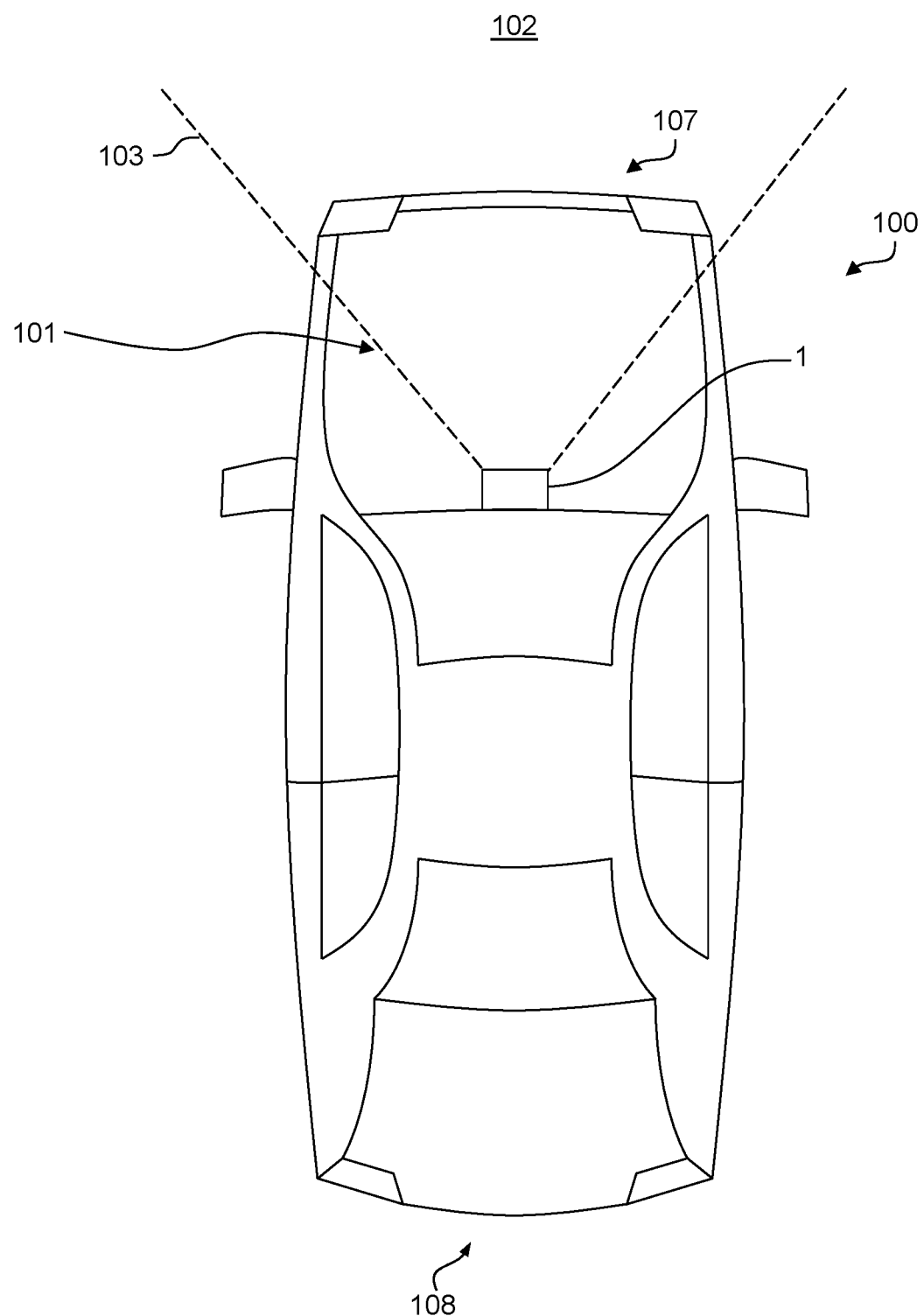

| | | | |
|---|---|---|---|
| EP | 2574509 | A2 | 4/2013 |
| EP | 3623797 | A1 | 3/2020 |
| JP | H11326186 | A * | 11/1999 |
| JP | 2014113410 | A * | 6/2014 |
| JP | 2015-20053 | A | 2/2015 |
| WO | 92-18359 | A1 | 10/1992 |

OTHER PUBLICATIONS

German Search Report in corresponding German Application No. 10 2021 109 172.1, dated Nov. 24, 2021 (6 pages).
Office Action issued by the European Patent Office for corresponding EP Patent Application No. 22720661.2, mailed Sep. 26, 2025 (5 pages).

* cited by examiner

METHOD FOR CALIBRATING A RAIN SENSOR, COMPUTER PROGRAM PRODUCT, RAIN SENSOR SYSTEM AND VEHICLE

The invention relates to a method for calibrating a rain sensor, a computer program product for executing such a method, a rain sensor system and a vehicle comprising such a rain sensor system.

Rain sensors can be used in vehicles to measure a quantity of water such as rain on a windscreen of a vehicle. DE 10 049 401 A1 discloses a rain sensor including a transmitter and a receiver which are arranged at a distance from each other. The transmitter injects light into the window, where it gets reflected multiple times before reaching the receiver. An intensity of the received light decreases as the quantity of water on the window increases. Transmission and reflection holograms are used to increase the distance between the transmitter and the receiver while maintaining a high measurement accuracy.

US 2002 121 972 A1 discloses a rain sensor with a similar layout. To avoid an erroneous detection of window irregularities or fog on the interior of the window to be detected as rain, a polarizing filter is used.

It is one objective of this invention to provide an improved method for calibrating a rain sensor.

According to a first embodiment, a method for calibrating a rain sensor is provided. The rain sensor is configured to measure a quantity of rain on a window of a vehicle, the rain sensor including a transmitter and a receiver, the transmitter being configured to emit or transmit light to the window and the receiver being configured to receive measurement light that is emitted or transmitted by the transmitter and guided to the receiver by the window. The method comprises:

varying an incidence angle of the light emitted or transmitted by the transmitter to the window.

By varying the incidence angle, in particular while the rain sensor is mounted on the window, the rain sensor can be calibrated. The calibration prevents the light guided by the window to miss the receiver. The calibration also increases the accuracy with which the rain sensor measures the quantity of rain. Calibrating the rain sensor by modifying the incidence angle is advantageous because the transmitter and/or receiver may remain at the same location, without being moved for the calibration.

The vehicle may be a passenger vehicle, such as a car, bus, truck, train, plane or the like. The window of the vehicle is preferably a windscreen (front window) or a back window of the vehicle. The window can be made of glass. Measuring a quantity of rain on the window can be useful to accordingly control the wipers.

The transmitter either generates light or transmits received light. In both cases, light emitted or transmitted by the transmitter is guided towards the window such as to couple the light into the window. If the transmitter generates light, it can be implemented as a light emitting diode (LED). To adjust the divergence of the light emitted by the LED, the transmitter may further include a lens, in particular a Fresnel lens, free-form optics and/or holographic elements. If the transmitter transmits light, it can include one or multiple optical elements such as lenses. Preferably, the transmitter includes one or multiple prisms, blazed gratings, diffraction gratings, holographic elements, free-form optics or the like.

The window may reflect the received light on its inside and thereby guide the light towards the receiver. When no water is present on the window, the window may perform multiple total reflections on the light between the transmitter and the receiver. In particular, the light gets totally reflected at window-air interfaces, in particular because the refractive index of the glass forming the window is higher than that of air. The refractive index of the receiver is preferably higher than the refractive index of the window. As a result, at the window-receiver interface, the light leaves the window and reaches the receiver.

The receiver can be a photoelectric receiver, a photodiode, an inverted LED or any other light sensitive opto-electronic element. The receiver can for example detect how much light is incident on the receiver and/or at which angle. Depending on how much water, in particular rain, is present on the window, the transmission of light by the window varies. In particular, as compared to the case where no water is present on the window, a window with water droplets transmits less light to the receiver due to a loss of the total reflection in the window.

The transmitter and the receiver can be arranged on the same side of the window, for example facing an interior of the vehicle. The transmitter and the receiver are for example mechanically independent (uncoupled) elements which in particular are not attached to each other. In other words, the transmitter and/or the receiver can be displaced independently from the other element. Preferably, the transmitter and the receiver are not housed in the same housing.

"Calibration" in the context of the present rain sensor in particular means adjusting the propagation path of the light through the window to increase and/or maximize the light intensity at the receiver. Calibrating the rain sensor is important to ensure that sufficient light reaches the receiver. If the amount of light reaching the receiver is not large enough, it may become difficult to distinguish between cases where no, little or much rain is on the window. Thus, the calibration can be important for ensuring a correct function and a high accuracy of the rain sensor.

The calibration may be done by adapting the angle at which the light is coupled into the window. This angle is designated as the "incidence angle" or "angle of incidence". The incidence angle is preferably the angle between the light emitted or transmitted by the transmitter and incident on the surface of the window and the line perpendicular to the surface of the window at the point of incidence, called the normal. Expressed differently, the incidence angle can be defined as the angle at which the light from the transmitter hits the window. Modifying the incidence angle can shift the propagation trajectory of the light within the window along a direction parallel to the window. In particular, depending on the incidence angle, no light or light at different intensities reaches the receiver.

The angle is preferably varied autonomously, without requiring a user to manually change the angle. In particular, the incidence angle is varied without displacing and/or rotating the transmitter and/or receiver.

According to an embodiment, the method includes varying the incidence angle without changing a position of the transmitter.

Varying (or equivalently modifying, changing or adjusting) the calibration angle is preferably performed once the transmitter and receiver are attached to the window, without displacing the transmitter and/or receiver.

According to a further embodiment, the method further comprises:

detecting an intensity of the measurement light received at the receiver; and determining an operation incidence angle which is an incidence angle for which the detected intensity of the measurement light received at the receiver is larger than a predetermined threshold and/or is largest.

The steps of varying the incidence angle and of detecting the intensity of the measurement light may be performed simultaneous or one after another. The intensity of the measurement light at the receiver may be detected for different incidence angles. The intensity values for the different incidence angles can be stored in a storage unit.

The operation incidence angle can be determined as being the first incidence angle or one of the incidence angles for which the intensity is larger than a predetermined (preferably previously stored) threshold value. It is also possible to define the incidence angle leading to the highest intensity of measurement light as the operation incidence angle. "Largest" here means largest amongst a number of intensities detected at different incidence angles, wherein said number may be larger than 1, 10, 50 or 100.

According to a further embodiment, the method further comprises:
operating the rain sensor at the operation incidence angle to measure the quantity of rain on the window.

The incidence angle may be set as the operation incidence angle. This may be done by varying the incidence angle to reach the operation incidence angle. With the incidence angle set as the operation incidence angle, the rain sensor can be used to determine the rain quantity on the window. The operation of the rain sensor with the incidence angle being the operation incidence angle can be performed after a calibration phase during which the incidence angle is varied and/or the operation incidence angle is determined.

According to a further embodiment, varying the incidence angle includes switching continuously or stepwise between different incidence angles.

For example, varying the incidence angle is performed during the calibration phase (prior to the operation phase) only. Switching the incidence angle continuously can be understood as sweeping or scanning over all or over some possible incidence angles in a continuous manner.

On the other hand, varying the incidence angle stepwise can mean varying the incidence angles in a discontinuous manner, in particular only selecting predetermined discrete incidence angle values. For example, the incidence angles can be changed in small increments (such as 1°, 2° or 5° increments) at predetermined time intervals (such as 5 or 10 seconds, for example).

The calibration of the rain sensor may be performed once (for example, at the end of the production line) or regularly (for example at technical inspections of the vehicle, monthly, yearly, every time the vehicle is turned on or the like).

According to a further embodiment, the transmitter includes a light emitting element, in particular a light emitting diode (LED), wherein the incidence angle is varied by varying a voltage applied to the light emitting element.

An alignment of the rain sensor may be performed by varying the voltage applied to the light emitting element. In detail, it is known that the light deflection of optical elements (diffractive or refractive) depends on the wavelength of the emitted light. This is known as Snell's law. Using the property that the emitted optical spectrum of a light emitting element such as an LED is slightly changed depending on the applied voltage, the wavelength of the emitted light and hence its incidence angle can be adjusted by varying the voltage applied to the light emitting element.

In particular, the applied voltage can be adjusted depending on the light intensity measured by the receiver. By applying several typical voltages and analyzing the light intensity at the receiver, it can be identified which voltage allows the best light transmission and pre-select it. Then, based on this pre-selected voltage, the highest performance (highest transmission) can be determined in a fine tuning (for example, in a continuous scan of the voltages around the pre-selected voltage).

According to a further embodiment, the transmitter includes a light emitting element, in particular a light emitting diode, and a liquid crystal element placed in the light path between the light emitting element and the window, wherein the incidence angle is varied by varying an electric field applied to the liquid crystal element.

The combination of the light emitting element with the liquid crystal element forms a transmitter with a variable emitting/incidence angle. The liquid crystal element may be placed between the light emitting element and the window. The liquid crystal element can be an adaptive optical element, the optical properties of which depend on an electric field applied thereto. The liquid crystal element may include liquid crystal molecules, which orientate differently depending on the applied electric field. Depending on the orientation of the molecules, the refractive index of the liquid crystal element changes, allowing to modify the light path of the light going through the liquid crystal element.

By modifying the electric field applied to the liquid crystal element, the incidence angle of the light emitted by the transmitter can be varied. This functionality can be used to align the rain sensor.

In particular, the electric field applied to the liquid crystal element can be adjusted depending on the measurement light intensity measured by the receiver. By applying several typical electric fields and analyzing the light intensity at the receiver, it can be identified which electric field allows the best light transmission and pre-select it. Then, based on this pre-selected electric field, the highest performance (highest transmission intensity) can be determined in a fine tuning (for example, in a continuous scan of the electric fields around the pre-selected electric field).

According to a further embodiment, the transmitter and the receiver are arranged at a distance from each another.

The transmitter and the receiver being arranged at a distance from each another means that they can be arranged at different locations along the window with a (for example predetermined) distance therebetween. The transmitter and the receiver are preferably arranged far enough from each another so that the light is reflected multiple times in the window between the transmitter and the receiver. Thereby, the accuracy of the detection made by the receiver is increased.

According to a further embodiment, the receiver analyzes the received measurement light to determine the quantity of rain on the window.

The analysis of the received measurement light can be a determination of the intensity of the received measurement light and/or of an incidence angle of the received measurement light, in particular as a function of time. The receiver may transmit the determined quantity of rain to a control unit, for example as a digital signal. The control unit may control an operation of the window wipers in accordance with the received signal.

According to a further embodiment, the rain sensor system comprises several transmitters and/or several receivers.

This can improve the reliability of the detection of how much rain is on the window, and can thereby increase the accuracy and reliability of the rain sensor system. Alternatively or in addition thereto, using multiple transmitters and/or receivers enlarges the detection area of the rain sensor.

According to a second aspect, a computer program product comprising instructions which, when the program is executed by a computer, cause the computer to carry out the method according to the first aspect or according to an embodiment of the first aspect is provided.

A computer program product, such as a computer program means, may be embodied as a memory card, USB stick, CD-ROM, DVD or as a file which may be downloaded from a server in a network. For example, such a file may be provided by transferring the file comprising the computer program product from a wireless communication network. The computer program product can be embodied in a processor unit of the rain sensor, which is also used to control the operation of the transmitter and receiver and/or to determine the quantity of rain on the window. The computer program product can also be part of a processor unit of a camera device located on the window and configured to capture images of an area surrounding the vehicle using camera optics.

According to a third aspect, a rain sensor system is provided. The rain sensor system comprises:
 a rain sensor configured to measure a quantity of rain on a window of a vehicle, the rain sensor including a transmitter and a receiver, the transmitter being configured to emit or transmit light to the window and the receiver being configured to receive measurement light that is emitted or transmitted by the transmitter and guided to the receiver by the window; and
 a calibration unit configured to vary an incidence angle of the light emitted or transmitted by the transmitter to the window.

In particular, the rain sensor system is configured to perform the method according to the first aspect and/or according to any embodiment of the first aspect.

According to a fourth aspect, a calibration unit for use in the rain sensor system according to the third aspect is provided. The calibration unit is configured to vary an incidence angle of the light emitted or transmitted by the transmitter to the window.

In particular, the calibration unit is configured to perform the method according to the first aspect and/or according to any embodiment of the first aspect.

According to a fifth aspect, a vehicle comprising the rain sensor system according to the third aspect is provided.

Embodiments and features described in view of one aspect also apply to the other aspects.

The invention has been described in terms of different embodiments. It is to be understood that one or more features of any one embodiment may be combinable with one or more features of the other embodiments. In addition, any single feature or combination of features in any of the embodiments may constitute additional embodiments.

Further embodiments or aspects of the invention are subject to the depending claims and the examples which are described in the following with reference to the figures.

Figure 2:
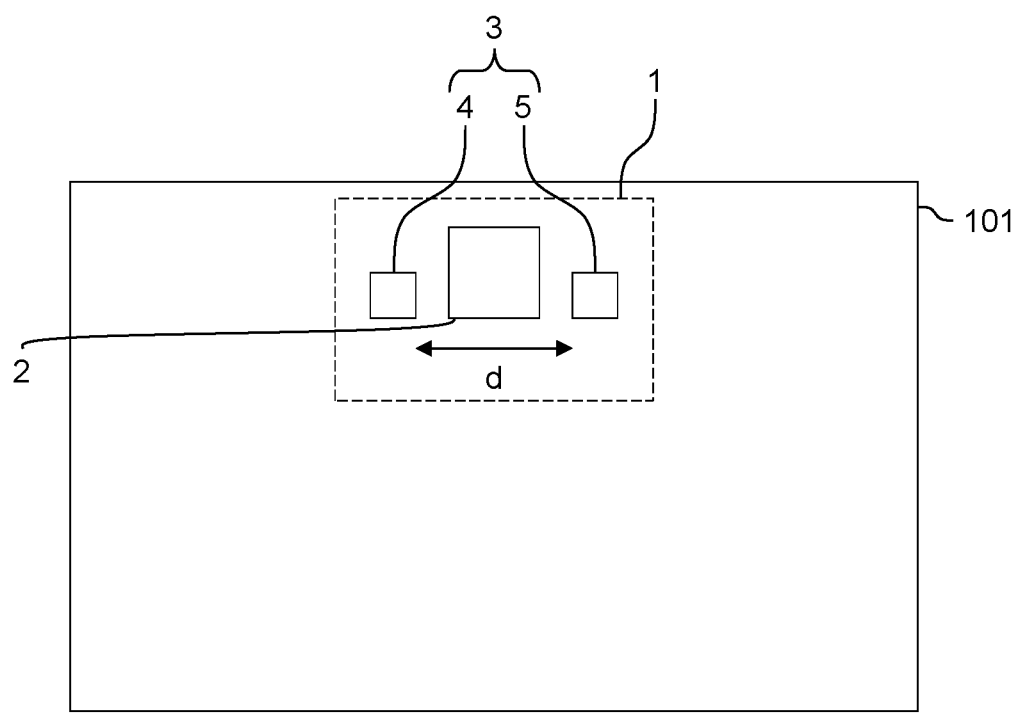
Figure 3:
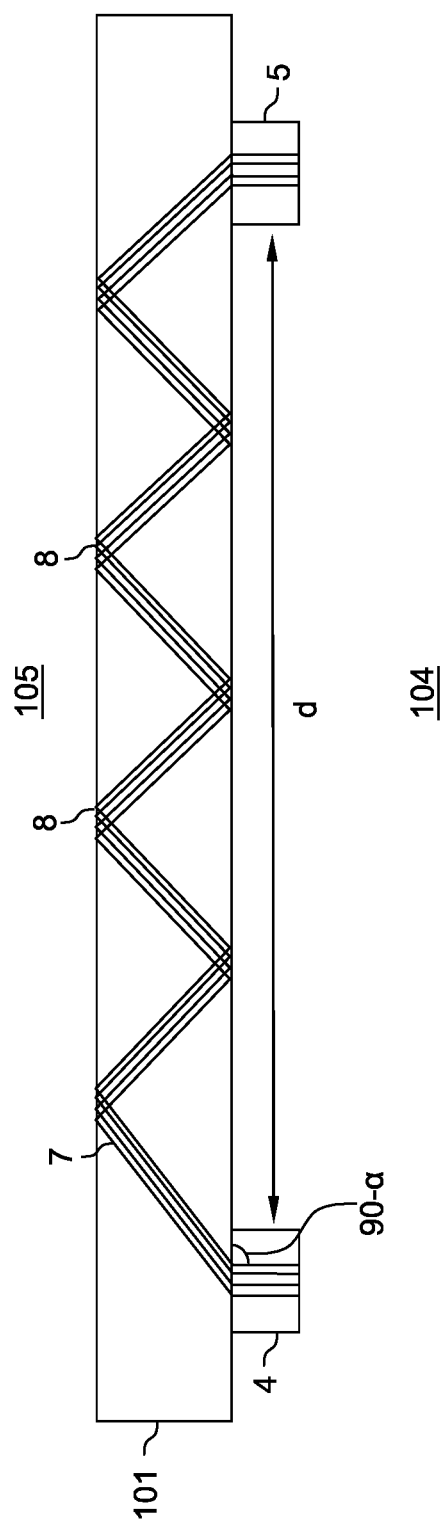
Figure 4:
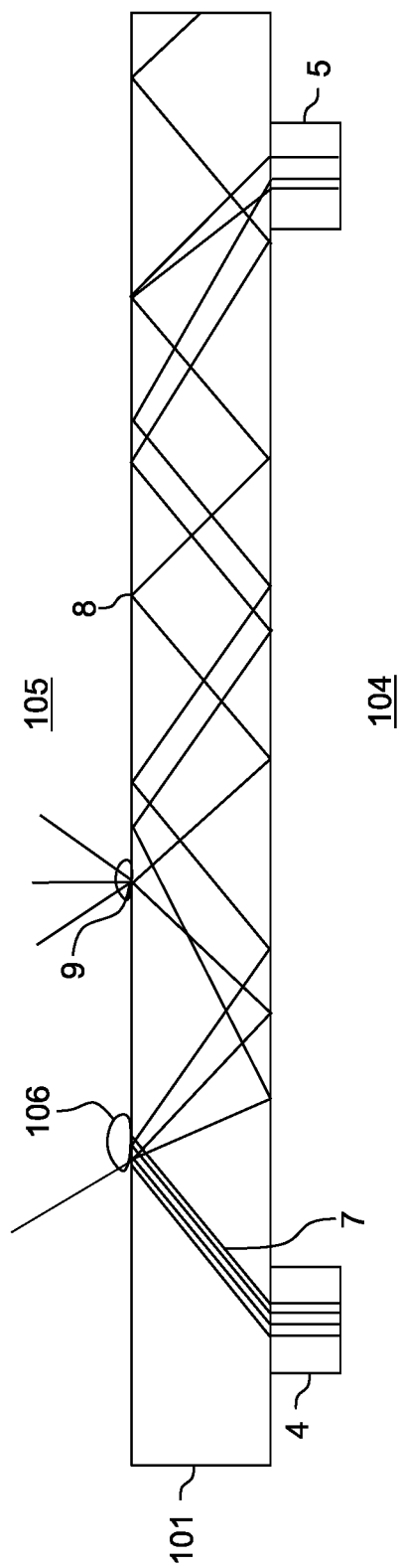
Figure 5:
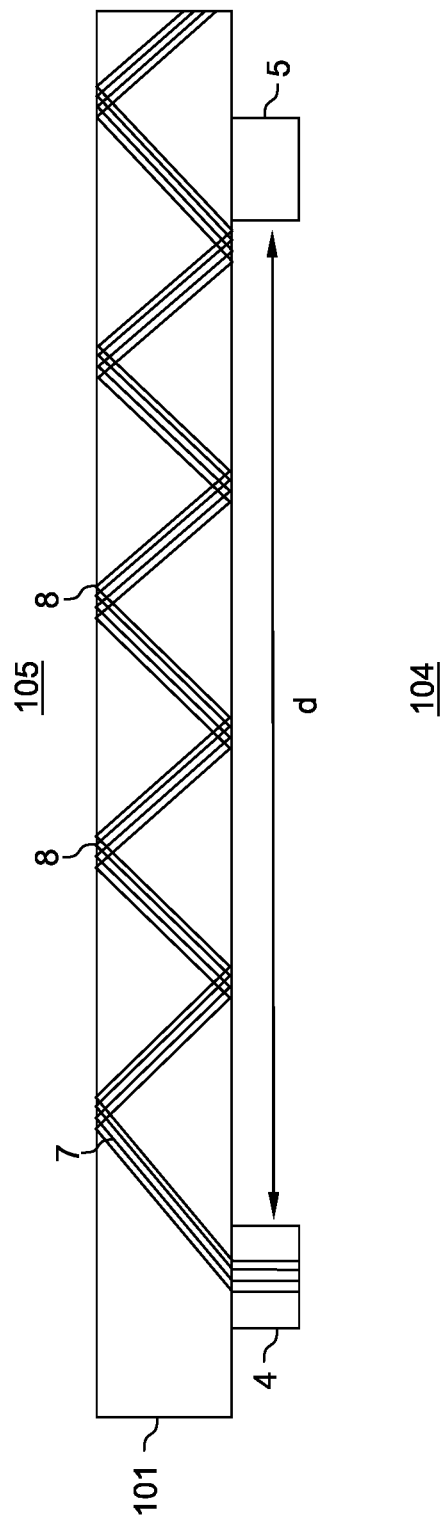
Figure 6:
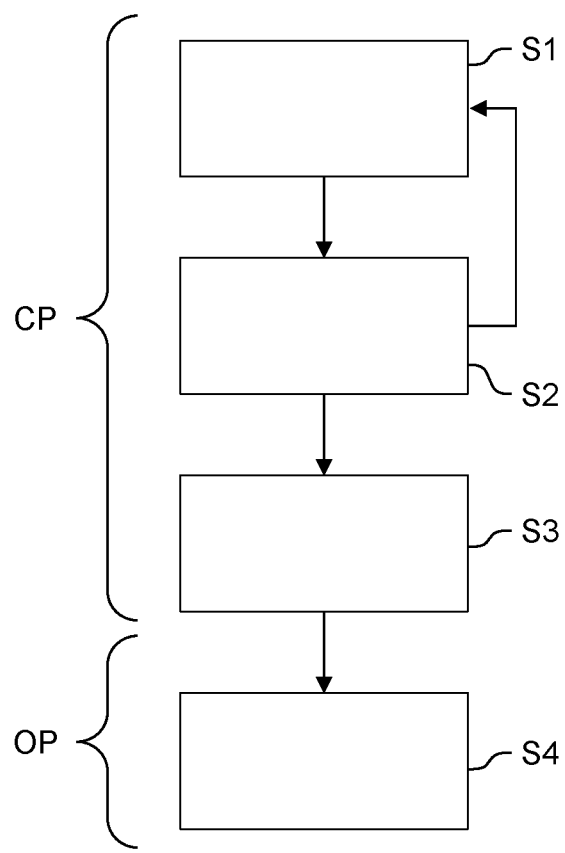
Figure 7:
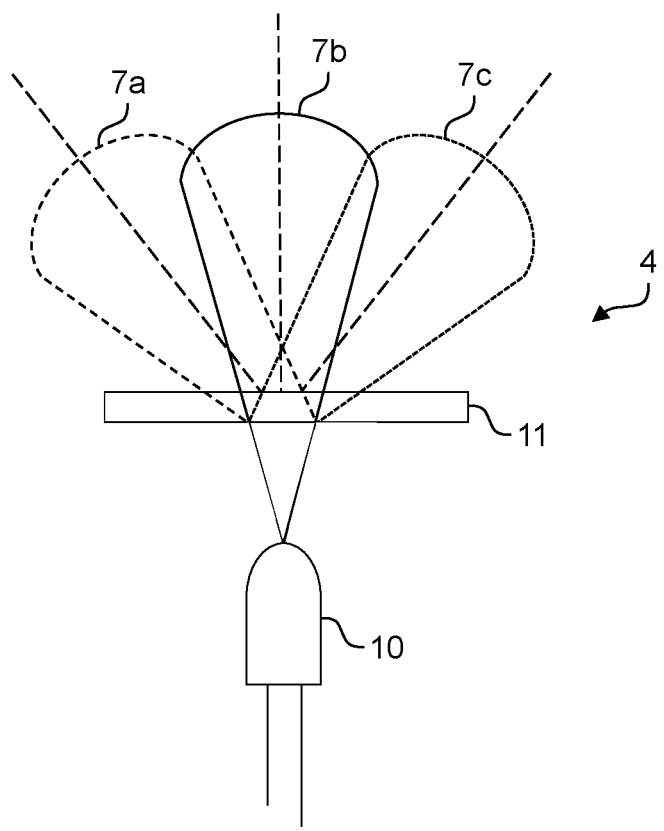

FIG. 1 shows a view of a vehicle;
FIG. 2 shows a rain sensor system according to an embodiment;
FIG. 3 shows light propagating in a window without rain and a calibrated rain sensor;
FIG. 4 shows light propagating in a window with rain and a calibrated rain sensor;
FIG. 5 shows light propagating in a window without rain and a non-calibrated rain sensor;
FIG. 6 shows a method for calibrating a rain sensor; and
FIG. 7 shows an example for a transmitter.

In the figures, like elements are denoted with the same reference numerals unless otherwise indicated.

FIG. 1 shows a view of a vehicle 100, which is a car. On its front 107, the car 100 has a window 101, which is a windscreen. In the interior of the car 100, a rain sensor system 1 is mounted to the window 101. The rain sensor system 1 is mounted at or near a rear-view mirror (not shown) of the car 100.

The rain sensor system 1 of the car 100 is for example the rain sensor system 1 shown in FIG. 2. FIG. 2 shows the side of the rain sensor system 1 which is visible from the outside of the car 100, through the window 101. The rain sensor system 1 is located such that it is hidden by a rear mirror of the car 100 when viewed from the car's 100 interior.

As shown in FIG. 2, the rain sensor system 1 includes a calibration unit 2 and a rain sensor 3. The rain sensor 3 comprises a transmitter 4 and a receiver 5. The transmitter 4 and the receiver are preferably two separate elements, which can be moved independently with respect to each other as they are placed on the window 101.

The transmitter 4 and the receiver 5 are mechanically fixed to the window 101 with a silicon gel (for refractive index matching) placed between the transmitter 4 and the window 101 and between the receiver 5 and the window 101.

The transmitter 4 and the receiver 5 are arranged at a distance d from each other. In the embodiment of FIG. 2, the rain sensor system 1 is symmetric.

The operating principle of the rain sensor 2 is explained in view of FIGS. 3 and 4. The interior 104 and the exterior 105 of the car 100 are separated by the window 101. The transmitter 4 emits light using an LED and injects light beams 7 into the window 101 at an incidence angle $\alpha$. The transmitter 4 and the receiver 5 are located sufficiently far from each other such that the light beams 7 can be totally reflected by the window 101 multiple times at total reflection points 8 (only some are labelled in FIGS. 3 to 5) before reaching the receiver 5. The multiple reflections of the light beams 7 in the window 101 increase the accuracy of the rain sensor system 1.

The receiver 5 includes a photodiode which converts the received measurement light into an electric current. Thus, an output of the receiver 5 is an electric signal proportional to the intensity of the received light.

In FIG. 3, there is no rain on the window 101. As a result, the light beams 7 are all totally reflected multiple times and the light intensity received at the receiver 5 is substantially equal to the intensity emitted by the transmitter 4.

On the other hand, when there are raindrops 106 on the window 101, as it is the case in FIG. 4, the raindrops 106 change the reflection of the light beams 7. As a result, depending on the amount of water (or equivalently on the number of raindrops 106) on the window, some or all of the light beams 7 get partially reflected along their trajectories towards the receiver 5. As indicated in FIG. 4, at the partial reflection points 9, some of the light does not get reflected and instead leaves the window 101. This lost light is then "missing" from the light detected by the receiver 5. Therefore, a light intensity detected at the receiver 5 decreases as the rain quantity increases, allowing to determine how much water there is on the window 101.

In order to function properly, the rain sensor 2 is calibrated before being used. Indeed, in a non-calibrated rain sensor 2, as the one shown in FIG. 5, the light beams 7 propagating through the window 101 follow a path that makes them miss the receiver 5. As a consequence, the receiver 5 does not detect any light (or too little light) and the rain quantity on the window 101 can not be determined. The calibration of the rain sensor 2 allows adjusting the trajectory of the light beams 7 to cause sufficient light to fall onto the receiver 5.

The rain sensor system 1 can be used to calibrate the rain sensor 3 without displacing or rotating the transmitter 4 and/or receiver 5. To this end, the incidence angle α is varied, thereby adjusting the trajectory of the light beams 7. This passive calibration is controlled by the calibration unit 2 and will be described in view of the method shown in FIG. 6.

The method of FIG. 6 includes a calibration phase CP with steps S1, S2 and S3 as well as an operation phase OP with a step S4. The steps S2 to S4 are facultative.

In step S1, the incidence angle α is varied. The variation of the incidence angle α is controlled by the calibration unit 2. FIG. 7 shows an example of a transmitter 4 which may be used in the method of FIG. 6. As shown in FIG. 7, the transmitter 4 comprises a light emitting element 10, which is an LED, and a liquid crystal element 11 arranged between the LED 10 and the window 101 in the light path of the emitted light.

By varying an electric field applied to the liquid crystal element 11, an orientation of liquid crystal molecules of the liquid crystal element 11 changes and the optical properties of the liquid crystal element 11 change. As a result, the orientation of the light beam 7 leaving the liquid crystal element 11 varies depending on the applied electric field. This is illustrated in FIG. 7 by the shown superposition of three light beams 7a, 7b, 7c, which have different orientations and hence different incidence angles α on the window 101. In step S1, the calibration unit 2 varies the electric field applied to the liquid crystal element 11 to vary the incidence angle α.

In step S2 of FIG. 6, the receiver 5 detects the intensity of the received measurement light. As explained above in view of FIGS. 3 to 5, the intensity of the received measurement light varies depending on the trajectory of the light and on how well the rain sensor 3 is calibrated. In other words, the detected light intensity depends on the incidence angle α.

The steps S1 and S2 can be performed synchronously and/or repeatedly. In detail, for each newly selected incidence angle α (step S1), the corresponding received light intensity is measured at the receiver 5. The receiver 5 provides an electric current signal proportional to the received light intensity to the calibration unit 2 for analysis.

After a predetermined time or after all predetermined incidence angles α have been tested, in a step S3, an operation incidence angle is determined as the incidence angle α at which the measurement light intensity received at the receiver 5 is detected as being highest in step S2. The incidence angle α of the rain sensor 3 is then set to the determined operation incidence angle.

In step S4, during the operation phase OP, the rain sensor 3 is operated with the incidence angle α set to the operation incidence angle determined in step S3 to determine the rain quantity on the window 101. In the operation phase OP, the incidence angle α is no longer varied.

The steps S1 to S4 may be repeated regularly, for example monthly, to ensure a good calibration of the rain sensor 3 and ensure accurate rain quantity measurement results.

As an alternative to the above-described method and rain sensor 2, the transmitter 4 may only include a light emitting element 10 (such as an LED) and no liquid crystal element 11. In such a case, in step S1, the calibration unit 2 controls the rain sensor 2 to vary the incidence angle α by modifying the voltage applied to the light emitting element 10. Apart from this difference, the analysis of the received measurement light intensity and all remaining steps of the method of FIG. 6 remain identical with those described above.

While the present technology has been described in connection with several practical examples, it is to be understood that the technology is not to be limited to the disclosed examples, but on the contrary, is intended to cover various modifications and equivalent arrangements. For example, the calibration unit 2 can be part of the transmitter 4 and/or receiver 5. The calibration unit 2 may also be arranged within a camera device positioned on the window 101 such that a field of view 103 thereof extends to the front 107 of the car 100. The camera device 2 can monitor an area 102 surrounding the vehicle 100 (see FIG. 1). Further, the vehicle may be a train, truck or the like instead of a car. The rain sensor system 1 could be mounted at the back 108 of the vehicle 100 instead of at the front 107 (see FIG. 1).

REFERENCE SIGNS

1 rain sensor system
2 calibration unit
3 rain sensor
4 transmitter
5 receiver
7 light beam
7a-7c light beams
8 total reflection point
9 partial reflection point
10 light emitting element
11 liquid crystal element
100 vehicle
101 window
102 surrounding area
103 camera's field of view
104 interior
105 exterior
106 rain drop
107 front
108 back
α incidence angle
CP calibration phase
d distance
OP operation phase
S1-S4 method steps

The invention claimed is:

1. A method for calibrating a rain sensor the method comprising:
   measuring, by the rain sensor a quantity of rain on a window of a vehicle wherein the rain sensor includes a transmitter and a receiver wherein the transmitter is configured to emit or transmit light to the window and wherein the receiver is configured to receive measurement light that is emitted or transmitted by the transmitter and guided to the receiver by the window and varying an incidence angle of the light emitted or transmitted by the transmitter to the window; detecting an intensity of the measurement light received at the receiver; and determining an operation incidence angle which is an incidence angle for which the detected intensity of the measurement light received at the receiver is larger than a predetermined threshold and/or is largest; and operating the rain sensor at the operation incidence angle to measure the quantity of rain on the window.

2. The method according to claim 1, further comprising:
varying the incidence angle without changing a position of the transmitter.

3. The method according to claim 1,
wherein varying the incidence angle includes switching continuously or stepwise between different incidence angles.

4. The method according to claim 1,
wherein the transmitter includes a light emitting element, in particular a light emitting diode, and wherein the incidence angle is varied by varying a voltage applied to the light emitting element.

5. The method according to claim 1,
wherein the transmitter includes a light emitting element, and a liquid crystal element placed in the light path between the light emitting element and the window, and wherein the incidence angle is varied by varying an electric field applied to the liquid crystal element.

6. The method according to claim 1,
wherein the transmitter and the receiver are arranged at a distance from each another.

7. The method according to claim 1,
wherein the receiver analyzes the received measurement light to determine the quantity of rain on the window.

8. The method according to claim 1,
wherein the rain sensor comprises several transmitters and/or several receivers.

9. A computer program product comprising instructions which, when the program is executed by a computer, cause the computer to carry out the method according to claim 1.

10. A rain sensor system, comprising:
a rain sensor configured to measure a quantity of rain on a window of a vehicle,
wherein the rain sensor includes a transmitter and a receiver,
wherein the transmitter is configured to emit or transmit light to the window and
wherein the receiver is configured to receive measurement light that is emitted or transmitted by the transmitter and guided to the receiver by the window; and
a calibration unit configured to vary an incidence angle of the light emitted or transmitted by the transmitter to the window.

11. A vehicle comprising the rain sensor system according to claim 10.

* * * * *